United States Patent [19]

Perry

[11] Patent Number: 5,086,459
[45] Date of Patent: Feb. 4, 1992

[54] TIMING CIRCUIT AND A SECURE TELEPHONE JACK UTILIZING THIS CIRCUIT

[75] Inventor: Steven B. Perry, Perrineville, N.J.
[73] Assignee: Keptel, Inc., Tinton Falls, N.J.
[21] Appl. No.: 483,875
[22] Filed: Feb. 23, 1990
[51] Int. Cl.$^5$ .............................................. H04M 1/66
[52] U.S. Cl. ...................................... 379/200; 379/188
[58] Field of Search ................. 379/200, 399, 8, 2, 379/32, 33, 188, 199, 387, 412, 442; 307/594, 595, 273, 605, 269, 265; 331/111, 143, 144

[56] References Cited

U.S. PATENT DOCUMENTS

| | | | |
|---|---|---|---|
| 3,202,937 | 8/1965 | Anderson | 331/111 |
| 3,392,352 | 7/1968 | White | 333/111 |
| 4,159,400 | 6/1979 | Hall et al. | |
| 4,182,934 | 1/1980 | Keys et al. | |
| 4,679,224 | 7/1987 | Lynch | 379/26 |
| 4,748,653 | 5/1988 | Kerr | 379/32 |
| 4,811,378 | 3/1989 | Else et al. | 378/179 |
| 5,003,586 | 3/1991 | Wright | 379/399 X |

Primary Examiner—James L. Dwyer
Assistant Examiner—Ahmad F. Matar
Attorney, Agent, or Firm—Peter L. Michaelson

[57] ABSTRACT

A timing circuit and apparatus that utilizes this circuit. The apparatus is particularly suited for use with a telephone network interface, for substantially preventing a third party who gains access to the interface from placing an unauthorized telephone call through a network connection obtained through a jack, typically modular, located in a customer portion of the interface. Specifically, this apparatus is connected in series within the telephone company side of the interface to illustratively a ring lead of an incoming subscriber loop. In operation, the apparatus provides network access, by supplying loop current, on a timed periodic (repetitive) basis to a telephone (or other equipment through which a telephone call can be placed) plugged into the jack located within the network interface. Access is provided for a period of time that is sufficient to test loop current but is insufficient to allow the network to complete a call dialed from that telephone over this loop. However, between any two successive intervals during which the apparatus supplies loop current to the telephone, the apparatus interrupts this current for a period of time that is sufficient for a switching machine at a local central office that serves this loop to interpret the cessation of current as an on-hook condition, completely terminate any call that may be in progress for this telephone and reset the loop.

3 Claims, 2 Drawing Sheets

TIMING CIRCUIT AND A SECURE TELEPHONE JACK UTILIZING THIS CIRCUIT

BACKGROUND OF THE INVENTION

1. Field of the Invention

The invention relates to a timing circuit as well as apparatus that utilizes this timing circuit. The apparatus is particularly suited for use with a telephone network interface, for substantially preventing a third party who gains access to the interface from placing an unauthorized telephone call through a network connection obtained through this jack located in a customer portion of the interface.

2. Description of the Prior Art

In the current deregulated telephone environment, a local telephone company ("telco") provides a subscriber loop (telephone line), and both local telephone service and access through its switching facilities for its local subscribers to long distance vendors, but is generally not responsible for the wiring ("inside wiring") and telephone equipment existing inside a subscriber's premise. As such, a physical point of demarcation typically exists on a subscriber loop where the responsibility over that loop shifts from a local telco to a particular subscriber. Having defined such a point for each loop, it has become quite advantageous over the past few years to connect test equipment through a telephone network interface to each subscriber loop at its point of demarcation. Doing so allows the subscriber, interconnect company or local telco to test the loop and thereby determine not only whether a fault exists in the loop but also, importantly, whether that fault lies within the local telco portion of the loop or within the subscriber's portion, i.e. inside wiring and customer premise equipment connected thereto. This test equipment may illustratively contain circuitry that tests the amplitude and frequency of dial tone provided by the central office and appearing on the loop at least up to its point of demarcation. One example of such subscriber loop test equipment is described in detail in U.S. Pat. No. 4,679,224 (issued July 7, 1987 to D. Lynch et al and owned by the present assignee).

For the convenience of the local telco, the point of demarcation, at which the subscriber loop telephone network interface is located, should be situated at a location which is readily accessible to telco maintenance personnel. As such, for a residential premise, the telephone network interface is typically situated outside of the subscriber's premise. This network interface generally has a first or "telco" portion which contains the actual subscriber loop wiring and a lightning arrester and appropriate wiring connections leading to a modular, typically type RJ 11, telephone jack. A second or "customer" portion of the interface contains a wiring or entrance bridge connected through a short length of telephone cable to typically a modular RJ 11 plug that mates with the jack. Customer wiring terminates at four screw terminals located on the wiring bridge. Different line entrances exist on the enclosure. These entrances permit a telco to separately route its end of a subscriber loop to appropriate terminals residing within the telco portion of the interface; while a customer can route an end of its inside wiring to the screw terminals situated on the entrance bridge located within the customer portion of the interface. Normally, a subscriber can gain access through a door only to the second portion of the enclosure, while telephone maintenance personnel can gain access to the entire enclosure through a different door. The enclosure is provided with a lock loop through which the customer can attach a lock in order to secure the customer portion of the enclosure.

Through use of such a telephone network interface and specifically through the modular jack contained therein, a telephone maintenance person can easily disconnect the telephone plug leading to the wiring bridge and instead connect a telephone to the telco end of the subscriber loop for any additional loop tests. Although the customer portion of the enclosure is expected to be locked in order to shield the modular jack from anyone who is not associated with either the subscriber or the telco, any lock can, with sufficient effort, be compromised by third parties. Moreover, the customer may be remiss in its responsibility to install a lock on its portion of the enclosure in order to thwart third party access. In any event, once a third party gains access to the customer portion of the interface and specifically to the jack situated therein, that party could merely unplug the subscriber wiring from the modular jack and, in its place, plug a telephone into the jack in order to obtain a network connection. Through this connection, the third party would obtain dial tone and be able to place unauthorized telephone calls through the subscriber's loop.

Presently, the use of telephone network interfaces is relatively new in the telephone industry. As such, the vast majority of subscriber lines, particularly those that have been in place for quite a number of years, generally five or more, do not yet possess such interfaces. Accordingly, due to the relatively small number of these interfaces currently in use as compared to the total number of telephone subscriber loops that are currently in service, theft of telephone services through these network interfaces has not yet reached significant or, for that matter even noticeable, proportions. Nevertheless, as the use of these interface continues to proliferate, more and more loops will unfortunately become susceptible to unauthorized third party access through these interfaces. Accordingly, the number of fraudulent calls made by unauthorized third parties through physical connections established through these interfaces is likely to significantly increase, unless sufficient measures are taken to curb their occurrence. Ultimately, as with other types of telephone fraud, the costs of such calls will likely be transferred by the telcos, through increased rates, to all of their local telephone subscribers.

Given the current limited use of telephone network interfaces and the present lack of appreciable or even noticeable telephone service theft therethrough, the art has not yet recognized, much less addressed, the problem of effectively preventing such theft—though the need to do so increases each day as additional network interfaces are installed on new or existing subscriber loops.

Therefore, an increasing need currently exists in the art for apparatus, and a method for use therein, for use in conjunction with a telephone network interface for substantially preventing an unauthorized third party who gains access to a customer portion of the interface from placing unauthorized telephone calls over a subscriber loop through the interface, and specifically through a modular jack associated therewith. Advantageously, by meeting this need now, a future source of telephone fraud can be substantially eliminated before it reaches noticeable proportions and adversely affects local telephone rates.

SUMMARY OF THE INVENTION

Through the teachings of my present invention, I have advantageously solved the problem of how to substantially prevent a third party who gains access to a telephone network interface from placing an unauthorized telephone call through a network connection obtained through a modular jack located in a customer portion of the interface.

Specifically, in accordance with the teachings of my present invention, my inventive apparatus is connected in series within the telephone company side of the interface to illustratively a ring (or tip) lead of an incoming subscriber loop. In operation, my apparatus provides network access, by supplying loop current, on a timed periodic (repetitive) basis to a telephone (or other communication equipment through which a telephone call can be placed) plugged into a telephone jack, typically a modular jack, located within the network interface. Access is provided for a period of time that is sufficient to test dial tone but is insufficient to allow the network to complete a call dialed from that telephone over this loop. However, between any two successive intervals during which the apparatus supplies loop current to the telephone, this apparatus interrupts this current for a period of time that is sufficient for a switching machine at a local central office that serves this loop to interpret the cessation of current as an on-hook condition, completely terminate any call that may be in progress for this telephone and reset the loop.

Now, in accordance with a preferred embodiment of my invention, my inventive apparatus has timing means and switch means, the latter being operative in response to a control signal, for controllably applying or interrupting the loop current otherwise supplied to an appropriate "standard" pin on the jack. The switch means is illustratively implemented using an appropriate field effect transistor in which its source and drain are to be effectively connected in series with one side, i.e. tip or ring, of the subscriber loop. The timing means has first means for timing an off-time time interval, and second means, responsive to the first means, for timing an on-time time interval and for producing the control signal so as to cause the switch means to block loop current during the off-time interval and conduct the loop current during the on-time interval. The first and second timing means are respectively implemented through a simple series resistor-capacitor (R-C) circuit, and a voltage breakover device and a parallel R-C circuit. The time constants of both R-C circuits as well as the specific breakover voltage of the breakover device are all chosen so that with use on 48 volt telephone systems, my inventive apparatus provides illustrative on- and off-time periods of approximately eight and two seconds, respectively. A bridge rectifier is also connected in series between the side of the subscriber loop and the drain and source of the field effect transistor in order to convert loop current, of a potentially unknown direction, flowing on the subscriber loop into uni-polar loop current flow through the transistor.

Furthermore, inasmuch as my inventive circuit operates as a timer to periodically and repetitively supply current to a load and consumes relatively little current to operate, then in accordance with a feature of my present invention, my inventive circuit can be utilized in a wide variety of different applications, particularly those that are battery powered, which require a load to be alternately energized and de-energized on a timed basis. These applications illustratively include battery powered flashers, audible alarms, sirens, beepers and the like.

BRIEF DESCRIPTION OF THE DRAWINGS

The teachings of the present invention may be readily understood by considering the following detailed description in conjunction with the accompanying drawings, in which.

To facilitate understanding, identical reference numerals have been used, where possible, to denote identical elements that are common to the figures.

DETAILED DESCRIPTION

After reading the following detailed description, those skilled in the art will readily appreciate that a timed network access circuit that embodies the teachings of my invention can be used in a conjunction with a wide variety of different connections to a telephone network to provide a timed connection of a sufficient duration to test dial tone that appears over that connection but is insufficient to enable a call dialed through that connection to be completed through the network. Such connections can illustratively encompass two or four wire, ground or loop start, analog or even ISDN connections to a telephone network. Loop start lines are used in connection with subscriber loops, while ground start lines are used in conjunction with, inter alia, private branch exchanges (PBXs). For the sake of simplicity, my invention will be illustratively discussed in the context of use with a two wire analog loop start telephone line.

Figure 1:
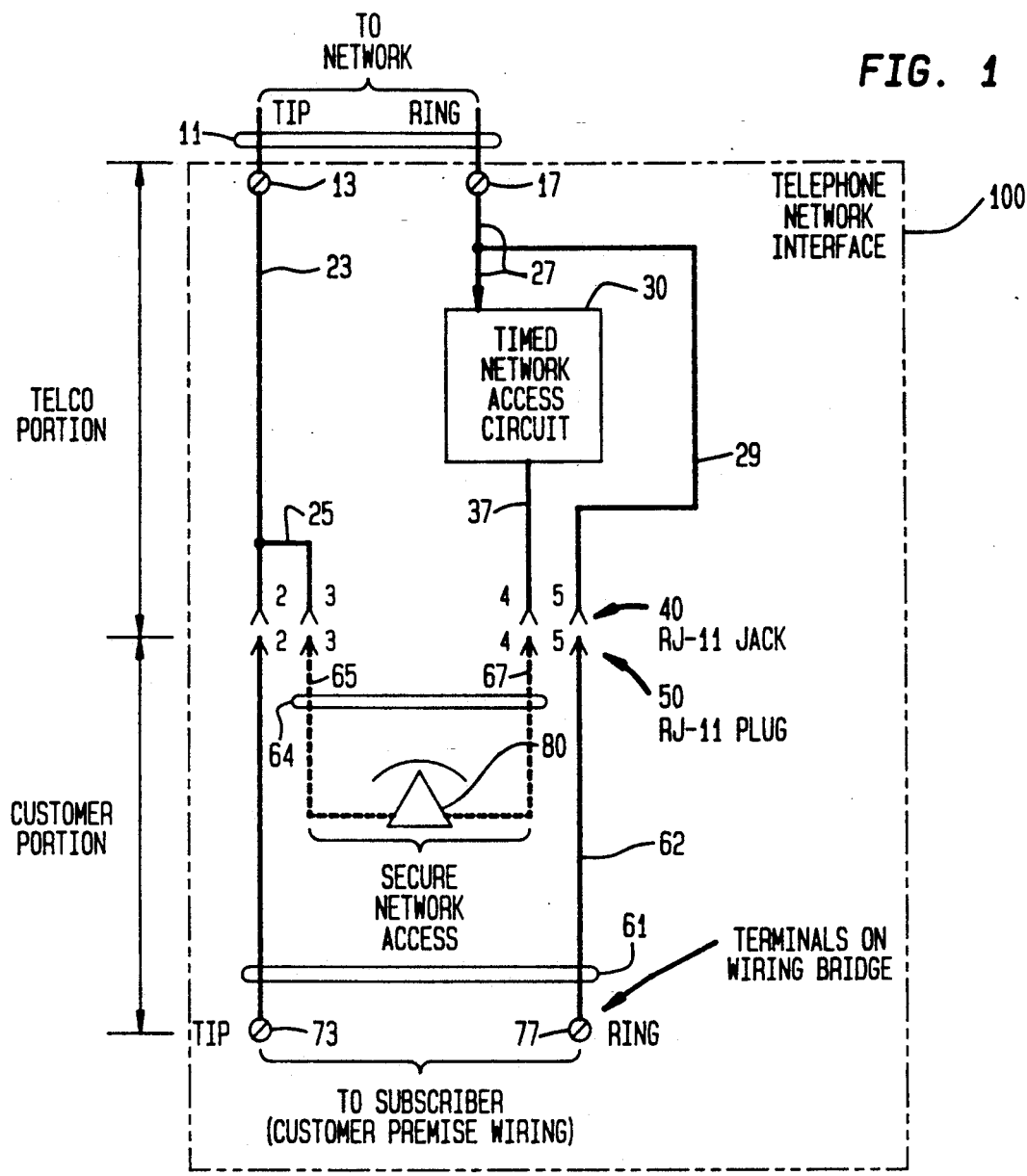
FIG. 1 is an overall block diagram showing a simplified depiction of a telephone network interface, specifically interface 100, containing my inventive timed network access circuit 30.

FIG. 1 is an overall block diagram showing a simplified depiction of a telephone network interface, specifically interface 100, containing my inventive timed network access circuit 30. Telephone network interface 100 is located at a point of demarcation on a subscriber loop, here subscriber loop 11 having separate tip and ring leads, in order to specifically define a point on the loop at which the responsibility of the loop shifts from the local telephone company to a telephone subscriber (customer) served by that loop. Not only does the telephone network interface readily define the point of demarcation for this loop but it also incorporates well-known loop protection and, in certain instances, loop test circuitry. During installation of the interface, the local telephone company wires loop 11 to appropriate terminals located within the interface which, in turn, extends the loop, through appropriate lightning arresters and wiring connections, to wiring terminals at which a customer connects his or her customer premise wiring. This wiring terminates at appropriate customer premise equipment (CPE), which, in its simplest form, consists of a single telephone set (not shown). Inasmuch as a telephone network interface, such as illustratively the model SNI-2100/2200 single/dual line network interface (as well as others) currently manufactured by the Keptel, Inc. (which is also the present assignee) of Tinton Falls, N.J., is well known in the art, the circuitry, such as inter alia the lightning arrestors, located in the interface but which is immaterial to a full understanding of the present invention has been omitted from FIG. 1 in order to simplify both the figure and its accompanying description.

Telephone network interface 100 has a telephone company ("telco") portion which contains the actual subscriber loop wiring and a lightning arrester and appropriate wiring connections leading to modular, typically type RJ 11, telephone jack 40. A "customer" portion of the interface contains a four-wire entrance bridge (not specifically shown), which contains terminals 73 and 77, connected through a short length of telephone cable having leads 63 and 69 to typically modular type RJ 11 plug 50. Customer premise wiring terminates at four screw terminals, of which only terminals 73 and 77 are specifically shown and used for a two wire subscriber loop, located on the wiring bridge. The other two terminals (not specifically shown) on the wiring bridge are used in conjunction with four wire lines. Different line entrances exist on the enclosure. These entrances permit a telco to separately route its end of subscriber loop 11 to appropriate terminals, specifically terminals 13 and 17, typically situated on a lightning arrestor and residing within the telco portion of the interface; while a subscriber can route two-wire loop 61, which terminates his or her inside wiring, to screw terminals 73 and 77. During normal use, RJ-11 plug 50 is mated with RJ-11 jack 40 to extend loop 11 through interface 100 as loop 61 for connection to the customer premise wiring.

Normally, a customer can gain access through a door (not shown) only to the second portion of the enclosure, while telephone maintenance personnel can gain access to the entire enclosure through a different door (also not shown). The enclosure is provided with a lock loop (not shown) through which the customer can attach a lock in order to secure the customer portion of the enclosure.

Telephone network interface 100, as described thusfar, is well known in the art. Through use of telephone network interface 100 and specifically through modular jack 40 contained therein, a telephone maintenance person can easily disconnect telephone plug 50 leading to the wiring bridge and instead connect a telephone to the telco end of subscriber loop 11 for any additional loop tests. Although the customer portion of the enclosure is expected to be locked in order to shield modular jack 40 from anyone who is not associated with either the subscriber or the telco, any lock can, with sufficient effort, be compromised by third parties. Moreover, the customer may be remiss in its responsibility to install a lock on its portion of the enclosure in order to thwart third party access. In any event, once a third party gains access to the customer portion of the interface and specifically to jack 40 situated therein, that party could merely unplug the subscriber wiring from the modular jack and, in its place, plug a telephone into jack 40 in order to obtain a network connection. Through this connection, the third party would obtain dial tone and be able to place unauthorized telephone calls through the subscriber's loop.

Advantageously, I have developed apparatus (and methods for use therein) for inclusion preferably within a telephone network interface that substantially prevents an unauthorized third party who gains access to the customer portion of interface 100 from placing unauthorized telephone calls through the interface, and specifically through modular jack 40 associated therewith. This, in turn, substantially eliminates what may otherwise become a future source of telephone fraud before it reaches noticeable proportions and adversely affects local telephone rates.

In accordance with the teachings of my present invention, my inventive apparatus, specifically timed network access circuit 30, is wired in series with an incoming subscriber loop and is located within a telco portion of the network interface. This circuit provides network access through the modular jack to a telephone that has a standard interconnect wiring for a period of time that is sufficient to test dial tone appearing on the subscriber loop and provided by the network but is insufficient to permit the network to complete a telephone call therethrough. Once modular plug 50 is unplugged from jack 40 and a telephone set, illustratively telephone 80, is plugged therein, circuit 30, in response to (battery) voltage, typically 48 volts DC, appearing over subscriber loop 11 and supplied thereto by a local central office (not shown), thereafter—as long as the telephone remains plugged into the jack—periodically interrupts loop current to the jack, typically every eight seconds, for a period of time, typically two seconds, to enable the network to completely terminate any telephone call then being established in response to any digits entered through the telephone and reset the loop.

Specifically, telephones are conventionally and generally universally wired such that subscriber loop connections appear on pins three and four (similarly marked in FIG. 1) of a modular plug connected thereto, here plug 50. In telephone network interfaces known in the art, network connections are brought directly to pins three and four of the modular jack. Hence, if telephone 80 were to be plugged into a modular jack situated within a well-known telephone network interface, then that telephone would have unrestricted access to the network, thereby permitting a third party caller to place unauthorized calls through the network via subscriber loop 11. In accordance with my invention, these unrestricted network access connections are moved to non-standard pins, specifically pins two and five, on modular jack 40. Modular plug 50 is similarly wired such that the unrestricted network access connections are extended via leads 63 and 69 to terminals 73 and 77 for connection to the customer premise wiring. Pins three and four of jack 40 are wired to provide access restricted rather than unrestricted connections. Specifically, tip lead 23 associated with subscriber loop 11 is extended, via leads 23 and 25, which are connected together, to pins two and three of jack 40 and therethrough to mating pins two and three of plug 50. Next, ring lead 27 associated with subscriber loop 11 is wired to an input of timed network access circuit 30. From there, lead 37 routes the output provided by circuit 30 to pin four of jack 40. Once loop voltage is applied by a central office to subscriber loop 11, circuit 30, as noted above, interrupts loop current on ring lead 37 and hence on two wire loop 64 on an oscillating (repetitive) illustrative eight second on, two second off pattern. The eight-second on time of the loop current is simply insufficient for the telephone network to complete a call dialed from telephone 80. During the two-second off time, a switching machine at a local central office that serves subscriber loop 11 will simply interpret the cessation of loop current as an on-hook condition, completely terminate any call then in progress for this telephone and reset the loop. As such, telephone 80, by virtue of its universal interconnect wiring and when plugged into modular jack 40, will only receive, via loop 64, restricted network access as provided by circuit 30. Ring lead 27 is also routed via lead 29 to pin five of jack 40. However, through mating pins two and five of jack 40 and plug 50, a customer will receive unrestricted network access through leads 23 and 29 associated with loop 11 and leads 63 and 69 associated with loop 61. Although circuit 30 is shown as being situated on the ring lead for telephone 80, this circuit could just as easily be situated on the tip lead therefor inasmuch as loop current to this telephone can be interrupted through either lead. Likewise, pins 1 and 6 may be substituted for pins 2 and 5, as any other non-standard wiring connection may be chosen.

Because circuit 30 is not undertaking any precision measurements of the subscriber loop but rather is merely interrupting loop current, it is not necessary to interrupt the loop on a balanced basis, i.e. simultaneously interrupt both sides of the loop. Moreover, since the circuit 30 merely imposes a point voltage drop on subscriber loop 11 rather than a distributed drop along the loop, use of my inventive circuit has essentially no adverse impact, if any at all, on the performance of the subscriber loop. Furthermore, by not interrupting current on both sides of the loop, circuit 30 is not exposed to voltage potentials of damaging magnitude that may exist from one side of the loop to the other, thereby advantageously simplifying the design of the circuit for cost and reliability considerations. Alternatively, both sides of the loop can be switched, if desired, through use of suitable modifications being made to circuit 30.

Figure 2:
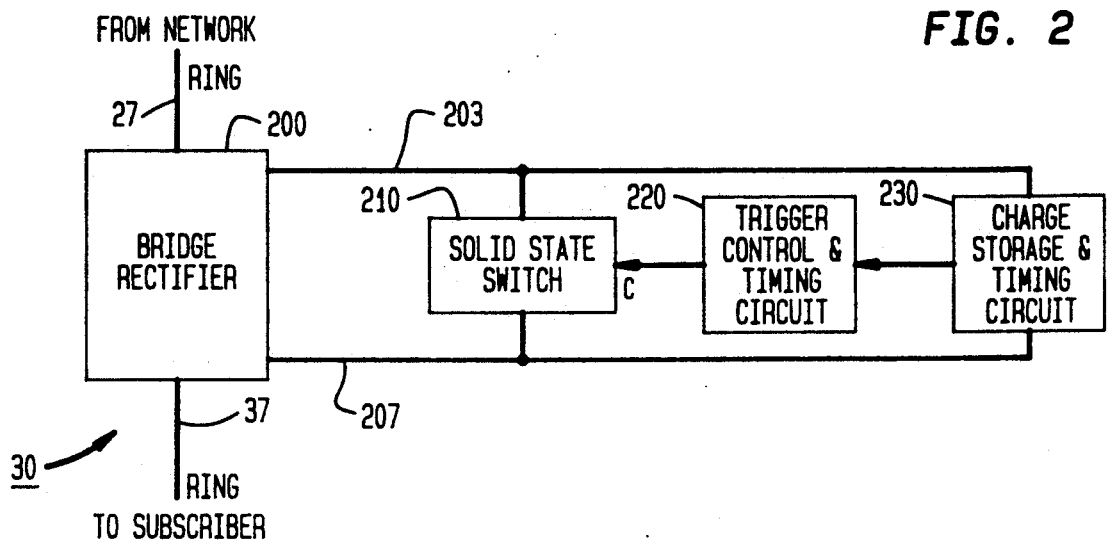
FIG. 2 is a block diagram of timed network access circuit 30 shown in FIG. 1.

FIG. 2 is a block diagram of timed network access circuit 30 shown in FIG. 1. Specifically, circuit 30 consists of bridge rectifier 200, solid-state switch 210, trigger control and timing circuit 220 and charge storage and timing circuit 230. Solid state switch 210, when energized, provides a path for loop current to flow through circuit 30 from ring leads 27 to 37 and, in turn, through telephone 80. When de-energized, switch 210 interrupts the flow of loop current to ring lead 37. This switch is controlled by circuits 220 and 230. Energy is required to energize switch 210; however, while switch 210 is energized the inputs to circuit 30 are essentially shorted together, through bridge rectifier 200, so that loop current can flow from leads 27 to 37. As such, circuits 220 and 230 store sufficient energy to maintain switch 210 energized throughout the on-time of circuit 30, here illustratively and approximately eight seconds. These circuits, in conjunction with switch 210, collectively function as a astable oscillator in which switch 210 is repetitively energized for approximately eight seconds to provide loop current, and then de-energized for approximately two seconds to interrupt loop current. Other times may easily and independently be chosen to suit a particular application.

Figure 3:
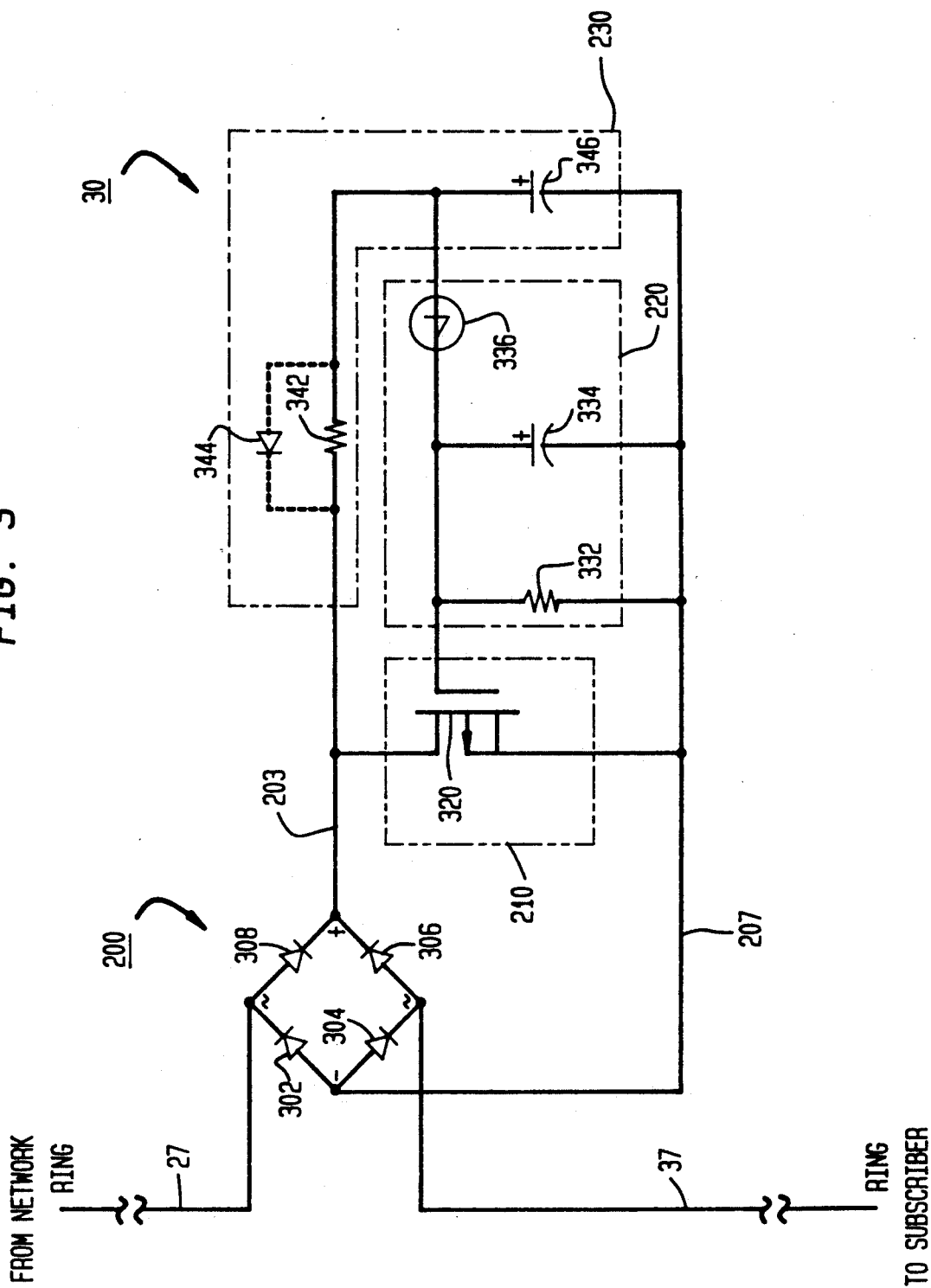
FIG. 3 is a schematic diagram of a preferred embodiment of timed network access circuit 30 shown in FIGS. 1 and 2.

In particular, circuit 230 is a timing circuit which charges a capacitor, specifically capacitor 346 as shown in FIG. 3. When the voltage across this capacitor reaches a pre-defined threshold level set by the breakover threshold of four-layer diode 336, circuit 230 applies a rising voltage level through diode 336 as a trigger to switch 210 and also transfers a portion of the stored energy from capacitor 346 to a capacitor situated within circuit 220, specifically capacitor 334. The voltage level, applied as a control signal to a gate of solid-state switch 210 as shown in FIG. 2, places this switch in a low impedance state. Inasmuch as switch 210 provides a low impedance output path for bridge rectifier 200, appreciable loop current flows through the bridge rectifier and from leads 27 to 37. At the same time, switch 210, while conducting, provides a low impedance path to quickly discharge the capacitor located within circuit 230. Circuit 220 then discharges at a much slower rate than does circuit 230 due to the isolation (as discussed below) provided by four-layer diode 336. The discharge time constant of circuit 220 is set to maintain switch 210 in a conductive state for approximately eight seconds. Once the control voltage supplied by circuit 220 to switch 210 reaches a sufficiently low level, switch 210 de-energizes. At this point, circuit 230 initiates its charging cycle, which after approximately a two second interval, transfers charge to circuit 220 that is sufficient to trigger switch 210 into conduction and so on.

Bridge rectifier 200 couples switch 210, which is typically uni-polar, to a potentially unknown direction of loop current, i.e. that which flows through the ring side of the subscriber loop. This, in turn, greatly simplifies the installation of circuit 30 to the subscriber loop. Inasmuch as the ring lead can easily become reversed in a field installation, bridge rectifier 200 enables circuit 30 to be polarity insensitive to the direction of loop current flowing through leads 27 and 37 and thereby properly function under a line reversal condition. Moreover, since switch 210 can be uni-polar rather than multi-polar, a wide variety of different voltage or current controlled solid state devices can be used to implement switch 210. For example, these devices could encompass a bipolar transistor or even a well known Darlington configuration, provided the values of capacitance and resistance used within circuit 30 are kept within practical limits consistent with any additional voltage drop that appears across these devices, when conducting, as compared to that appearing across a conducting FET. Clearly, a FET or similar device is preferable to a bipolar transistor(s) inasmuch as both the resistance and associated voltage drop appearing across a conducting FET may be lower and the gate resistance is substantially higher than the on resistance, voltage drop and base resistance, respectively, that are associated with a bipolar transistor. It should be noted here that switch 210 should not be implemented using a thyristor inasmuch as loop current can be interrupted or even reverse its direction (both of which entail that the current becomes or passes through a zero value) during a wide variety of normal loop and network conditions, such as during a request for service or dial tone, that occur in some telephone systems. Once this loop current decreases below a minimal value required to maintain the thyristor in conduction, the thyristor would become blocking. As such, the thyristor would then need to be triggered on to accommodate the loop current that flows immediately after any such interruption or reversal which, in turn, would disadvantageously complicate the gating circuitry of the thyristor and increase the expense of circuit 30.

FIG. 3 is a schematic diagram of a preferred embodiment of timed network access circuit 30 shown in FIGS. 1 and 2. As shown, bridge rectifier 200 is formed of four individual diodes 302, 304, 306 and 308. The alternating current inputs to the bridge are connected between ring leads 27 and 37. The outputs of the bridge are connected to lead 203 for the positive output and to lead 207 for the negative output. Solid state switch 210, which is connected across leads 203 and 207, is formed of field effect transistor (FET) 320. A wide variety of other switches, such as a bi-polar Darlington pair, could be used instead of a FET. The source and drain leads of FET 320 are respectively connected to leads 203 and 207. Charge storage and timing circuit 230 is formed of a series connection of capacitor 346, which is illustratively 10 µf in value, and resistor 342, which is illustratively 390 kΩ in value. One end of resistor 342 is connected to lead 203; one end of capacitor 346 is connected to lead 207, while the series junction between the other end of this resistor and the capacitor is connected to trigger control and timing circuit 220. The time constant formed by resistor 342 and capacitor 346 provides the two second off-time for circuit 30, specifically the time during which FET 320 is not conducting. Capacitor 346 also, as noted above, stores a portion of the energy that is required to maintain FET 320 energized throughout the eight second on-time for circuit 30. Diode 344, as shown by dashed lines, can be connected across resistor 342, if necessary, to substantially decrease the discharge time for capacitor 334 while assuring that capacitor 346 completely discharges while FET 320 is conducting. Use of diode 344 allows for increasingly predictable operation of circuit 30 and an easier choice of component values. Trigger control and timing circuit 220 is formed of four-layer breakover diode 336, resistor 332 and capacitor 334, with the latter two components being connected in parallel. Resistor 332 is illustratively 490 kΩ in value; capacitor 332 is illustratively 10 µf in value. One end of the parallel connection of resistor 332 and capacitor 334 is connected to lead 207; while the other end of this parallel connection is connected to both a gate of FET 320 and an anode of diode 336. The cathode of diode 336 is connected to the series junction of resistor 342 and capacitor 346. Diode 336 can be implemented through a diac or any other device(s), including an appropriately gated thyristor that provides a negative resistance characteristic with a known voltage breakover point and hence a similar function to a four-layer diode.

To readily understand the operation of circuit 30, as shown in FIG. 3, assume that FET 320 has just been de-energized. As such, loop current is interrupted with voltage appearing across output leads 203 and 207 of bridge rectifier 200. This causes the voltage appearing across capacitor 346 to increase at a rate determined by the time constant defined by the values of resistor 342 and capacitor 346. Now assuming that the voltage appearing across capacitor 334 is initially zero, then once the voltage appearing across capacitor 346 and hence across diode 336 reaches the breakover potential of this diode, which is illustratively and approximately 18 volts, this diode enters its negative resistance region and begins to conduct. Since, at this point, capacitor 334 is discharged, charge is very quickly transferred from capacitor 346 to capacitor 334 to equalize potentials appearing across both of these capacitors. As a result, current flow between these two capacitors rapidly decreases to zero thereby, as discussed below, turning off diode 336. Consequently, the voltage appearing across capacitor 334 rapidly increases and, being applied to the gate of FET 320, reaches a level sufficient to energize the FET. Once the FET is energized, it provides a low resistance path between leads 203 and 207 thereby permitting loop current to flow through bridge rectifier 200 and between leads 27 and 37. At the same time, this low impedance path provides a discharge path through resistor 342 and diode 344, if the latter is used, to rapidly discharge capacitor 346 while FET 320 is conducting. Once the voltages appearing across discharging capacitor 346 and capacitor 334 become equal, diode 336 enters its high impedance state due to insufficient holding current and ceases to conduct, thereby isolating circuit 230 from circuit 220. Furthermore, once this diode ceases to conduct, capacitor 334 starts discharging through resistor 332. Inasmuch as the gate of FET 320 presents a substantial input impedance, the rate at which the voltage across capacitor 334 and the gate voltage to the FET decays is determined by the time constant defined by the values of resistor 332 and capacitor 334. This time constant is set such that the voltage appearing across this capacitor will remain above the turn-on voltage for FET 320 for approximately eight seconds. Accordingly, FET 320 will remain on and conduct loop current for this time. Once the voltage appearing across capacitor 334 discharges below the turn-on gate voltage of FET 320, the FET de-energizes to interrupt loop current. Voltage then appears across leads 203 and 207 to initiate the charge cycle for capacitor 346. While capacitor 346 is charging and before the voltage appearing across diode 336 reaches its breakover potential, capacitor 334 continues to discharge through resistor 332 to approximately zero. The time constant associated with capacitor 334 is significantly longer than the time constant associated with capacitor 346. This time constant associated with capacitor 346 is set such that the FET 320 remains de-energized for approximately two seconds. Now, when the voltage appearing across diode 336 again reaches its breakover potential, the operation of circuit 30, as described above, simply repeats and so on to provide alternating periods of switched loop current: eight seconds on followed by two seconds off. The breakdown voltage of diode 336 and the values of capacitors 334 and 346 are all chosen such that the peak voltage that appears across these capacitors does not exceed the breakdown potential of FET 320 or of the capacitors themselves.

The preferred embodiment of my inventive circuit possesses the advantage that this circuit does not require any resetting. Specifically, capacitors 334 and 346 remain self-discharged if no loop voltage is applied to the circuit. Consequently, circuit 30 always starts, once loop voltage is applied to this circuit such as through connection of a telephone to loop 64 (see FIG. 1), with the loop current being off and capacitor 346 starting its charge cycle.

With the component values set forth above and loop current routed through circuit 30, this circuit is designed to operate with standard 48 volt telephone systems and interrupt loop current approximately every eight seconds for an approximately two second period. If operation is desired with other telephone voltages, then the component values, specifically the breakover value and possibly the type of device used for diode 336 may need to be changed accordingly. To provide a version of my inventive circuit that provides similar performance yet operates with a variety of different loop voltages, resistor 342 could be replaced with a constant current source, such as that implemented for example in a well known manner using a junction FET and a few additional parts. Doing so would provide similar charging times for capacitor 346 and similar two second off-times for circuit 30 with variations in loop voltage.

By now those skilled in the art realize that although I have described my inventive circuit as operating on an astable basis, my inventive circuit, could with suitable modifications, operate on a monostable basis. Specifically, rather than interrupting loop current every eight seconds, my circuit could be readily configured to merely provide loop current for a single eight second period following the connection of a telephone to loop 64, after which time the loop current would be continuously interrupted until the circuit was appropriately reset. Modifying the circuit to operate in this manner requires that a reset capability be incorporated into the circuit which unfortunately adds to the complexity and cost of my inventive circuit.

Furthermore, although I have described my inventive circuit for use within a telephone network interface, my circuit, being relatively simple and small and powered from the subscriber loop itself, could be readily incorporated into substantially any loop termination apparatus, e.g. a stand-alone modular jack or even a simple interconnect housing containing screw terminals—with suitable wiring changes dictated by the specific loop termination apparatus being used—through which personnel can gain access to a subscriber loop via standard connections that are "access restricted" in order to test dial tone that appears on the loop while substantially preventing an unauthorized telephone call from being made through these connections over that loop. Access in this fashion can be provided not only to telephone sets but to any communication equipment, such as but not limited to, for example, a modem, that can be connected to a subscriber loop and which can place a call over that loop. If desired, a subscriber can gain unrestricted network access through non-standard connections that appear on the termination apparatus.

In addition, my inventive circuit can be utilized in a wide variety of different applications that require a load to be alternately energized and de-energized on a timed basis. In particular, since my inventive circuit consumes a relatively low amount of power to operate, my circuit is very efficient. Accordingly, this circuit is ideal for use in many battery powered applications where power is to be applied on a timed basis to a load, such as illustratively flashers, audible alarms, sirens, beepers and the like. For example, my circuit could be connected in series with a battery mounted within a marine buoy to cause a warning light attached to the buoy to continuously blink on and off, or be readily incorporated within a flashlight or road sign flasher to provide a flashing warning light. Moreover, use of my circuit in conjunction with a regular incandescent light bulb can provide a simple, inexpensive and reliable replacement for a "blinker" bulb. Such a bulb, which is well known in the art, incorporates a thermo-mechanical bi-metallic element which is situated in series with an incandescent filament. During application of an electric current through the bulb, the element heats which, in turn, causes the element, after a given amount of time, to bend sufficiently far from an initial position to temporarily interrupt the flow of current both to the filament and the element, thereby extinguishing the light provided by the filament. As the temperature of the element subsequently cools during a finite period of time, the element bends back into its initial position and re-establishes electrical contact in order to supply current to the filament and generate light thereby. Unfortunately, because such bulbs rely on the bending action of a mechanical element, these bulbs tend to be unreliable and are also somewhat expensive. Such a bulb can be advantageously replaced by using my inventive circuit in series with an ordinary incandescent bulb. Rather than relying on movement of a thermo-electric element, my inventive circuit causes the bulb to blink on a continuous basis while eliminating the unreliability heretofore associated with blinker bulbs. Moreover, since the time constants associated with my inventive circuit can be readily changed within given limits, such as by using potentiometers for the fixed resistors, advantageously my inventive circuit easily provides variable timing intervals for a timed load which blinker bulbs and other similar thermo-mechanical timing devices are not readily able to provide. In addition, my inventive timing circuit may itself control circuits driven by alternating current and circuits containing high voltage which may otherwise have to be controlled with other more complicated timing circuits.

Although a single preferred embodiment of the present invention has been shown and described in detail herein, a wide variety of different embodiments that nevertheless incorporate the teachings of the present invention may be easily constructed by those skilled in the art.

I claim:

1. Apparatus for connection in series between a voltage source and a load for supplying current on a timed repetitive basis from the voltage source to the load, said apparatus comprising:

switch means, having a load current carrying path therethrough for connection between said load and said voltage source and a control terminal and being operative in response to a control signal applied to said control terminal, for interrupting said load current flowing through said path;

first means for timing an on-time period during which said load current is to be applied by said switch means to said load, said first means having a series combination of a first resistor and a first capacitor connected in parallel across said load current carrying path of the switch means; and second means, responsive to said first means, for timing an off-time period during which the load current is to be interrupted and for producing said control signal so as to cause said switch means to conduct load current during said on-time period and to interrupt load current during said off-time period, said second means having:

a voltage breakover device; and a parallel combination of a second resistor and a second capacitor, wherein said voltage breakover device is connected in series between a junction of said first capacitor and said first resistor and a junction of said second resistor and said second capacitor, and said second resistor and said second capacitor are connected in parallel between the control terminal of said switch means and one terminal of said load current carrying path of said switch means.

2. The apparatus in claim 1 wherein said switch means comprises a field effect transistor having a source, a drain and a gate, with said source and drain comprising said load current carrying path and said gate comprising said control terminal.

3. Apparatus for preventing a telephone call from being made from communication equipment attached through a telephone jack to a subscriber loop contained within a telephone network, said apparatus comprising:

- loop current controlling means, connected on a network side of said telephone jack and in series with a tip or ring side of said loop and operative in response to voltage appearing across a network side of said loop, for permitting current to flow through said loop and said telephone jack to said communication equipment only during a first time interval that is less than a first pre-defined interval of time, said first pre-defined time interval being a minimum amount of time required by the network to complete a telephone call in response to a telephone number entered through said communication equipment, and, upon expiration of said first time interval, interrupting said loop current flowing to said communication equipment for a second interval of time which is equal to or greater than a second pre-defined time interval, said second pre-defined time interval being a minimum amount of time which is required by the network to completely terminate the call; and
- a telephone network interface for providing a network connection for customer premise wiring to said subscriber loop, wherein said interface comprises:
- the telephone jack;
- means for connecting the customer premise writing through a non-standard wiring connection involving said jack to said subscriber loop;
- a first physical portion wherein the tip or ring side of said subscriber loop can be connected through first pre-defined terminals for routing to said jack; and
- a second physical portion separate from said first portion wherein said customer premise wiring can be connected through second pre-defined terminals to a plug associated with said second portion, wherein said plug matingly engages with said jack in order to extend said subscriber loop from said first portion to said second portion;
- wherein said loop current controlling means is located within said first portion and is connected in series between said first terminals and said jack and comprises:
- switch means, operative in response to a control signal, for controllably applying or interrupting said loop current to said telephone jack, wherein said switch means comprises a field effect transistor having a source, a drain and a gate, wherein the source and the drain are to be connected in series within said tip or ring side of said subscriber loop; and
- timing means comprising:
- first means for timing said second time interval, said first means comprising a series combination of a first resistor and a first capacitor connected in parallel across the source and the drain of said field effect transistor; and
- second means, responsive to said first means, for timing said first time interval and for producing said control signal so as to cause said switch means to block loop current during the second time interval and conduct the loop current during the first time interval, said second means comprising a voltage breakover device and a parallel combination of a second resistor and a second capacitor, said voltage breakover device being connected in series between a junction of said first capacitor and said first resistor and a junction of said second resistor and said second capacitor, and said second resistor and said second capacitor being connected in parallel between the gate and the source of said field effect transistor.

* * * * *